United States Patent Office 3,024,137
Patented Mar. 6, 1962

3,024,137
ALL-POSITION NICKEL-CHROMIUM ALLOY WELDING ELECTRODE
Charles E. Witherell, Bound Brook, N.J., assignor to The International Nickel Company, Inc., New York, N.Y., a corporation of Delaware
No Drawing. Filed Mar. 17, 1960, Ser. No. 15,553
6 Claims. (Cl. 117—205)

The present invention relates to a coated nickel-chromium alloy arc-welding electrode and, more particularly, to a nickel-chromium alloy welding electrode having a special flux-coating, which electrode deposits ductile, non-age-hardenable, sound overlayments, and is capable of joining similar and dissimilar metals of relatively thick cross-section, in all positions, and which produces austenitic welds that are essentially free of hot-cracking tendencies and porosity.

Heretofore, the art has endeavored to produce a nickel-chromium alloy welding electrode that was capable of producing austenitic nickel-chromium alloy welds or overlays in all positions that are free of hot cracking and porosity. One of the methods frequently used in the past to produce crack-free welds was to incorporate into the electrode a quantity of columbium to counteract the adverse effects of silicon on hot-cracking. Although this dextrine-bonded electrode had many beneficial qualities, it suffered from the drawback of producing welds or overlays that were porous, unless the electrode was given a high-temperature bake prior to use. Unfortunately, this high-temperature bake deteriorated the coating bond which then resulted in an excessively fragile coating.

In order to obviate the necessity of a commercially objectionable high-temperature rebake, the art produced an electrode having a silicate-type binder. This electrode was again unacceptable for the welding of metals of relatively large cross-section as the use of the silicate binder increased the amount of silicon recovered in the weld deposit, thus resulting in the hot-cracking of the weld or overlay.

Still another electrode utilized in the prior art, whenever crack-free welds or overlays were the objectives comprised a specially coated nickel-chromium alloy welding electrode that would produce a weld deposit or overlay containing small amounts of molybdenum, manganese and/or columbium. Although this electrode has performed its intended function well, that of joining dissimilar metals, cracking still persisted in the welds. Furthermore, when, in the past, these electrodes were modified to eliminate the detrimental tendency of the weld to crack under conditions of severe restraint, it was necessary to make the coating excessively thick. This resulted in the electrode being usable only in the downhand position. The art, accordingly, has been faced with an exceedingly complex and difficult problem.

Although many attempts were made to overcome the foregoing difficulties and other disadvantages, none, as far as I am aware, was entirely successful when carried into practice commercially on an industrial scale.

It has now been discovered that austenitic, ductile, non-age-hardenable welds and overlays, including iron-diluted welds and overlays, that are free of cracks and porosity can be made by employing a specially coated nickel-chromium alloy electrode containing controlled amounts of manganese.

It is an object of the present invention to provide an improved nickel-chromium alloy welding electrode suitable for the production of austenitic, ductile, non-age-hardenable, sound, nickel-chromium alloy welds or overlays that are free of hot-cracking even when appreciably diluted with iron.

Another object of the invention is to provide a coated welding electrode which has a nickel-base core wire and has a special flux coating containing, in novel combination, special proportions of ingredients, and which electrode is particularly adapted for use in all positions.

The invention further contemplates providing a special flux composition for use in combination with an electrode to provide ductile, crack-free, nickel-chromium alloy welds or overlays.

It is also an object of the invention to provide a specially coated electrode which has a nickel-base core wire and which is capable of effecting sound, crack-free, iron-diluted welds and/or overlays.

It is a further object of the invention to provide a nickel-chromium alloy welding electrode that has a durable coating.

Still another object of the invention contemplates an improvement in the method of welding or overlaying similar and dissimilar metals and alloys of relatively large cross-section with welds which are substantially free of hot-cracking and porosity.

The invention further contemplates the production of ductile, non-age-hardenable, cast alloys having good welding characteristics and free of cracks and porosity.

Still another object of the invention is to provide a method for producing austenitic non-age-hardenable cast alloys having good welding characteristics.

Other objects and advantages will become apparent from the following description.

Broadly stated, the present invention contemplates a coated welding electrode having a nickel-base core wire and a flux coating. In general, the core is made of nickel-chromium alloy which contains, in percent by weight, from about 10% to about 30% chromium, up to about 8% iron, from about 2% to about 3.5% titanium, up to 7% manganese, up to about 2% columbium, up to about 0.5% silicon, up to about 0.1% carbon, and the balance essentially nickel, with the nickel content being at least about 65%. In addition, the nickel-chromium alloy core wire is advantageously substantially devoid of aluminum, magnesium, sulfur and copper, although up to 0.10% aluminum, up to 0.10% magnesium, up to 0.015% sulfur, and up to 0.5% copper may be tolerated. The core wire may also contain a small amount of cobalt, e.g., up to about 2%, although advantageously the cobalt content does not exceed about 0.1%. The coating bonded to said core is a special carbonate-fluoride, e.g., limestone-cryolite, flux containing controlled amounts of manganese carbonate, manganese powder and titanium dioxide, with each constituent of the flux being in a special proportion with the other constituents thereof so that, together with the nickel-chromium alloy core wire, a coated arc-welding electrode is obtained which provides austenitic, ductile, non-age-hardenable welds or overlays having at least from about 3% to about 9.5% manganese, and, advantageously, about 6% to about 9.5% manganese. In addition, the welds and overlays produced through the use of the electrode provided in accordance with the present invention are free of cracks and porosity, regardless of the welding position used, even when relatively large sections are involved and conditions of severe restraint are present.

The dry flux of the coating contemplated by the present invention contains the following ingredients in the amounts set forth (in parts by weight of the dry flux).

TABLE I

| Ingredients: | Range |
|---|---|
| Alkaline earth metal carbonate | 15 to 40 |
| Cryolite | 10 to 35 |
| Manganese carbonate | 5 to 30 |
| Titanium dioxide (rutile) | 10 to 35 |
| Manganese powder | 5 to 35 |
| Bentonite | 2 to 5 |

Optionally, up to 20 parts of columbium as a ferro-columbium alloy containing, by weight, from about 30% to about 70% columbium, with the balance essentially iron, can be added to the dry ingredients to provide additional insurance against hot-cracking. Up to 20% of the columbium present may be replaced by tantalum. Most commercial sources of columbium usually contain tantalum in amounts up to 20% of the columbium content. Advantageously, manganese is incorporated into the flux as powdered electrolytic manganese having a particle size from about 50 to 300 microns. Low-carbon ferromanganese powder containing from about 80% to 90% manganese, up to 0.15% carbon, with the balance essentially iron, can be incorporated in the flux in the place of electrolytic manganese powder.

It is essential that all of the foregoing ingredients of the dry flux composition be present in the amounts specified in order to provide a coated electrode suitable for producing ductile, non-age-hardenable weld deposits or overlays which are substantially free of hot-cracking and porosity. The cryolite, for example, should be present in amounts from about 10 to about 35 parts by weight of the dry flux, as it imparts the required viscosity or surface tension to the welding slag and helps maintain control of the weld puddle in the vertical and overhead welding positions. If cryolite is present in amounts below the range specified, the slag produced during welding will lack the viscous properties necessary for vertical and overhead welding. However, if cryolite is present in amounts greater than the range specified, the arc characteristics deteriorate. The alkaline earth metal carbonate, advantageously calcium carbonate, and manganese carbonate should be present within the range specified in Table I, supra, as they are good arc stabilizers and slag formers. If too little calcium carbonate is incorporated into the flux, the slag becomes very difficult to remove. Conversely, if too much is used, the slag is too powdery and is not friable. In addition to its aforementioned other beneficial characteristics, manganese carbonate furnishes a further source of manganese to the weld.

Titanium dioxide, e.g., in the form of native rutile, is essential to the flux as it is largely responsible for good slag behavior, is beneficial in its stabilizing effect on the arc, and helps produce a friable slag that is easily removed. The slag, for example, becomes powdery and difficult to remove if the titanium dioxide level is decreased much below 10 parts by weight of the flux; on the other hand, excessive spatter will result if it is increased much beyond about 35 parts.

Bentonite or similar colloidal clays are included in the welding electrode because the presence of such colloidal clays greatly improves the extrudability of the flux.

The core of the electrode contemplated by the invention is a nickel-chromium alloy advantageously having the composition shown in Table II in weight percent of the core.

TABLE II

| Element | Range | Example |
| --- | --- | --- |
| Nickel | At least about 65% | About 70%. |
| Chromium | 15-20 | 17. |
| Titanium | 2-3.5 | 3. |

The titanium, in its role as a strong deoxidizer in controlling porosity, is essential to the electrode composition in the amounts set forth in Table II as it also serves the function of promoting more efficient recoveries of the alloying additions which are introduced through the coating, such as manganese. Furthermore, the unique balance of ingredients permits the titanium to be substantially fully consumed during welding, thus avoiding the undesirable age-hardening behavior which has been observed in weld deposits where a titanium residual is present.

The electrode core of Table II also desirably can contain the following elements as shown in the following Table III in weight percent of the core.

TABLE III

| Element | Broad range | Preferred range |
| --- | --- | --- |
| Manganese | Up to 7 | 2 to 4. |
| Columbium | Up to 3.5 | Up to about 2. |
| Iron | Up to about 8 | 5 to 8. |
| Silicon | Up to 0.5 | 0.1 to 0.2. |

The manganese can all be present in the flux or partly in the core and partly in the coating, as long as the manganese present in the electrode is from about 4% to 15%, and advantageously about 8% to 15%, by weight, of the electrode. In addition, columbium may be incorporated in the core or in the coating in amounts up to about 4.5%, by weight, of the electrode.

In carrying the invention into practice, it is advantageous to use the particular ingredients of the dry flux in the amounts set forth in the following Table IV (in parts by weight of dry flux):

TABLE IV

| Preferred ingredients | Range | Example |
| --- | --- | --- |
| Calcium carbonate | 15-25 | 18 |
| Cryolite | 10-25 | 18 |
| Manganese carbonate | 10-25 | 18 |
| Titanium dioxide (rutile) | 10-25 | 18 |
| Electrolytic manganese powder | 10-20 | 15 |
| Columbium [1] | 5-15 | 10 |
| Bentonite | 2-5 | 3 |

[1] As a ferrocolumbian alloy containing about 30% to 70% columbium by weight.

The ingredients used in making the flux are powdered ingredients. In general, the mixed ingredients should have a particle size of between 50 and about 300 microns.

A water dispersible binder is employed with the flux composition to provide a durable and hard coating on the nickel-chromium alloy core after drying and baking. The binder advantageously is of the silicate type as it produces a durable coating that does not require any rebake prior to use, which may be a solution of sodium silicate and/or potassium silicate. The following Table V gives the amounts (in parts by weight of the dry flux) of ingredients which can be used for the binder. It is to be noted, however, that ingredients of a different specific gravity than shown herein also can be used.

TABLE V

| Ingredient | Range | Example |
| --- | --- | --- |
| Sodium silicate solution (47° Baumé). | 10-20 | 15 |
| Water | As needed for extrudable consistency. | 2 |

The flux coating can be applied to the core wire in any suitable manner, e.g., by an extrusion process, and dried on the wire surface by suitable drying and/or baking. This results in a hard adherent coating of high mechanical strength relatively resistant to mechanical damage under normal handling conditions. A satisfactory drying or baking treatment of the flux and binder mixture comprises a normal continuous oven drying treatment followed by a baking treatment comprising gradually raising the temperature to about 600° F. and holding at that level for about two hours.

Examples of typical electrode dimensions (core diameter plus flux thickness) are given in Table VI. All dimensions therein contained are in inches.

TABLE VI

| Core diameter | Electrode diameter range | Electrode diameter example |
|---|---|---|
| 3/32 | 0.130–0.150 | 0.140 |
| 1/8 | 0.180–0.200 | 0.190 |
| 5/32 | 0.210–0.230 | 0.230 |
| 3/16 | 0.250–0.270 | 0.260 |

However, it is permissible, as will be apparent to those skilled in the art, to vary considerably the core diameter-flux thickness relationships from those proportions given in the preceding table. However, the flux coating constitutes from about 25% to 35% by weight of the electrode.

The compositions of the deposits and/or overlays, of course, will vary somewhat depending upon the exact composition of the flux, the type of core wire employed, and the composition of the base metal being welded. However, all weld deposits produced using the electrode of this invention will be austenitic and will have compositions in the ranges shown by Table VII in percent by weight.

TABLE VII

| Element | Range | Example |
|---|---|---|
| Nickel | Balance | About 70 |
| Iron | Up to 40 | 7 |
| Chromium | 10 to 20 | 15 |
| Manganese | At least 3 to 9.5 | 8 |
| Titanium | Less than 1 | 0.3 |
| Columbium | 0–3.5 | 2 |
| Cobalt | Up to 2 | 0.1 |

The weld deposits produced in accordance with the invention are themselves cast alloys which are characterized by high ductility, high strength, freedom from porosity, good corrosion resistance and good mechanical properties at elevated temperatures.

For the purpose of giving those skilled in the art a better understanding of the invention and a better appreciation of the advantages of the invention, the following illustrative examples are given:

*Example I*

An electrode was prepared from a core wire containing: 71% nickel, 16.5% chromium, 6.8% iron, 3.2% titanium, 2.3% manganese, 0.02% carbon, and 0.10% silicon. The core wire was coated with the flux composition set forth under "Example" in Table IV, by extrusion, using a binder consisting of about 15 parts by weight of the flux of sodium silicate solution (47° Baumé) and about 2 parts by weight of water. The electrode thus constituted was oven dried and subsequently baked at about 600° F. for about two hours.

*Example II.—All-Position Butt Weld*

To demonstrate the adaptability of the electrodes of this invention to arc welding in all positions, as well as to show the quality level of the all-position deposit, a butt weld was made, using the electrode described in Example I to join two pieces of nickel-chromium alloy pipe, each pipe having a ½ inch wall and a 2½ inch inside diameter containing 77% nickel, 16% chromium, 7% iron, 0.10% manganese and 0.2% silicon, firmly fixed to a support in such a manner that the axis of the pipe was horizontal. A weld joint was made completely around the circumference of the pipe without removing the pipe or rotating it from its fixed position. With the exception of the root pass, which was deposited by the inert-gas-shielded tungsten-arc process using a consumable nickel-chromium alloy insert ring, all welding was done using an electrode having the diameter as shown in Table VI, supra, for a 3/32 inch core diameter. About 6 passes were required to complete one bead around the periphery. The joint was composed of one single pass at the root, three sets of double lapping beads and one set of three lapping beads across the top. The total weldment, containing approximately 60 re-strikes, was radiographed using a 2% sensitivity penetrometer as defined in the Welding Handbook, 1957, section 1–8.39, published by the American Welding Society, and no porosity or defects could be observed on the radiograph. The completed weld was sectioned to provide 6 cross sections, about 60 degrees apart, for macroexamination. All 12 faces were polished, etched, and examined at about 30×, and were found to be free of porosity and cracking.

*Example III.—All-Position Butt Weld*

To further demonstrate the adaptability of the electrode of this invention to arc welding in all positions, and show the quality level of the all-position deposit, another butt weld was made using the electrode described in Example I to join two pieces of nickel-chromium alloy pipe, each pipe having a 1 inch wall and 9 inch inside diameter. The composition of the pipes was approximately the same as that given for the pipes in Example II, supra. The pipes were firmly fixed to supports in such a manner that the axes of the pipes were horizontal. Welding was carried out in the same manner as shown in Example II except that an electrode having a diameter as shown in Table VI for a 3/32 inch core diameter was used. After welding, the entire periphery of the joint was radiographed using a 2% sensitivity penetrometer, and no porosity or cracks were observed on the radiograph.

*Example IV.—Restrained Nickel-Chromium Alloy Butt Weld in 1¼ Inch Plate*

A downhand butt weld was prepared by joining two nickel-chromium alloy plates having the composition as set forth in Example II, supra. Each plate measured 4 inches wide, 12 inches long, and 1¼ inch thick. One 12 inch edge of each piece was bevelled, and three one inch thick steel wedges were machined to a shape conforming to the V formed by the butted edges of the plates. The wedges were placed in the V by tack welding, one at each end, and one at the center, to provide restraint while welding. Using an electrode, as described in Example I, having an 0.230 inch diameter and a 5/32 inch diameter core wire, the plates were welded together in the flat position, requiring 32 passes at about 120 amperes. After welding, the joint was radiographed using a two percent sensitivity penetrometer, and no porosity or defects could be observed in the radiograph. One-half of the plate was then sectioned into 6 transverse slices, 3/8 inch thick. The other half was used for machining of an all-weld-metal tensile specimen (0.505 inch diameter). Each of the 6 transverse slices from the weld was subjected to a 180 degree side bend test. An examination of the 6 bend specimens revealed no defects. The all-weld-metal tensile strength was 92,400 pounds per square inch (p.s.i.) with 45 percent elongation in 2 inches.

*Example V.—Restrained Nickel-Chromium Alloy-to-Steel Butt Weld in 1¼ Inch Plate*

A downhand-position butt weld was prepared, similar to that described in Example IV, except that only one of the plates was made of the nickel-chromium alloy having the composition set forth in Example II. The other plate was of mild steel. Using the same procedure employed and the same composition and diameter electrode as in Example IV, the two plates were welded together. A radiograph of the completed joint which included a two percent sensitivity penetrometer placed near the weld deposit did not disclose any porosity or defects. Side bend tests and an all-weld-metal tensile test were performed as in Example IV. All 6 side bends were examined after a 180 degree bend test and found to be free of defects, even though there was some iron-dilution from the mild steel member. The all-weld-metal tensile strength was 92,400 p.s.i. at 42 percent elongation in 2 inches.

*Example VI.—Nickel-Chromium Weld Overlay ½ Inch Thick on 4 Inch Thick Steel*

A block of A–212 pressure-vessel steel, containing about 0.3% carbon, about 0.9% manganese, about 0.3% silicon, with the balance essentially iron, 5 inches wide by 10 inches long and 4 inches thick was overlayed with a ½ inch thick deposit of metal from the welding electrode identical in composition and size with the electrode used in Example IV. Before welding, the block was given a modest preheat of 300° F. Three layers of weld metal composed of about 25 beads wide and 9 inches long were deposited on one of the 5 inch by 10 inch surfaces. After welding, the overlayed block was given a stress-relieving heat treatment of 1150° F. for 9 hours. After stress relief, the block was reduced in thickness by cutting to about 1½ inches, including the overlay deposit, to facilitate sectioning and bend testing. Eight ⅜ inch slices were cut from the overlay in a longitudinal direction, and nine ⅜ inch slices were cut in a direction transverse to the overlay weld beads. All slices were given a 180 degree side bend. After bending, all 17 bent slices were examined and no defects were observed. A representative slice was selected for chemical analysis of the weld deposit, and it was found that the iron content of the overlay varied from about 25 percent at 0.01 inch to 0.02 inch from the overlay-steel base metal interface to about 10 percent at a point about ¼ inch from the interface. In addition to the iron content of the weld metal mentioned hereinbefore, the overlay had the chemical analyses (in percent by weight) as shown by the following Table VIII.

TABLE VIII

CHEMICAL ANALYSIS OF WELD DEPOSIT ON A–212 STEEL

| Element | Distance from overlay-steel base metal interface | |
|---|---|---|
| | 0.01 inch to 0.02 inch | ¼ inch |
| Ni | Balance | 65 |
| Fe | 25 | 10 |
| C | 0.08 | 0.05 |
| Cr | 13.2 | 15 |
| Cb+Ta | 1.7 | 1.9 |
| Mn | 6.8 | 7.5 |
| Ti | 0.2 | 0.24 |
| Al | 0.01 | 0.01 |
| Si | 0.5 | 0.5 |

Thus, it is seen that the electrode of this invention produces crack-free nickel-chromium alloy welds which have excellent tolerance for iron dilution.

*Example VII.—Aging Response of Weld Deposits Produced Using Electrodes of This Invention*

An electrode having the composition and size as indicated in Example IV was used to deposit an all-weld-metal pad 1½ inches square by ½ inch thick. It was quantitatively determined that the deposited all-weld-metal pad contained, by weight, 14.8% chromium, 7.4% iron, 2% columbium plus tantalum, 0.6% silicon, 7.9% manganese, 0.4% titanium, 0.03% carbon, with the balance essentially nickel. The all-weld-metal pad was then given a heat treatment to determine if any aging response existed.

The results of the Rockwell "B" hardness impressions taken before and after a 1300° F. heat treatment for 15 hours are 85.6 and 86.0, respectively, which, of course, demonstrates that there was little or no age-hardening response. In some areas, this is a distinct advantage because there is no loss of weld ductility even when the weldment, including the weld produced in accordance with this invention, is subjected to a stress-relieving heat treatment. For example, in the fabrication of certain structures, such as the overlaying of heavy sections with weld metal, it has been found necessary to subject the weldments to a stress-relieving heat treatment.

*Example VIII.—Effect of Manganese on Hot Cracking of Nickel-Chromium Welds*

A series of experimental welding electrodes was prepared wherein the manganese addition from the flux coating only was varied from zero to the amounts of the present invention, as shown in Table I, supra. The proportioning of the ingredients with relation to each other was substantially the same as in Table I. The core wires contained about 3% titanium and about 2% manganese in all tests of this series. The coating compositions are given in Table IX hereinafter. (Note that no columbium is present in either the flux coating or the core wire of these electrodes.)

TABLE IX

| Electrode No. | Composition of dry flux in parts by weight | | | | | |
|---|---|---|---|---|---|---|
| | $CaCO_3$ | Cryolite | $MnCO_3$ | $TiO_2$ | Mn powder | Bentonite |
| 1 | 33 | 32 | | 32 | | 3 |
| 2 | 31 | 30 | 5 | 31 | | 3 |
| 3 | 30 | 30 | 7 | 30 | | 3 |
| 4 | 27 | 26 | 18 | 26 | | 3 |
| 5 | 25 | 24 | 18 | 25 | 5 | 3 |
| 6 | 23 | 23 | 18 | 23 | 10 | 3 |
| 7 | 22 | 21 | 18 | 21 | 15 | 3 |

Using these electrodes, a series of the "X-weld" crack tests was prepared. The "X-weld" crack test is made by forming a weld in which two 3-inch lengths of 1-inch square bar stock are joined with a double V groove-weld. The weld passes were laid in, two at a time, on alternate sides of the double V with sufficient time lapse between each pair of passes to permit the specimen to cool to below 100° F. During welding, visual examination was made of each pass after it had been laid in to determine whether any gross cracking had occurred. After welding, the specimen was sectioned twice on planes perpendicular to the direction of welding and the sectional surfaces of the weld were polished on a rubber-bonded fine abrasive wheel, etched, and examined under a binocular microscope for cracks. The results of these tests showing the beneficial effect of manganese are tabulated in Table X, infra.

TABLE X

| Electrode No. | Manganese content of weld metal in undiluted deposit, percent | Number of cracks [1] |
|---|---|---|
| 1 | 1.75 | 13 |
| 2 | 2.2 | 16.5 |
| 3 | 2.35 | 16 |
| 4 | 3.25 | 10 |
| 5 | 4.45 | 4 |
| 6 | 6.00 | 2 |
| 7 | 7.75 | 0 |

[1] The average number of cracks per "X-weld" cross-section as determined from examination of 4 polished and etched cross-sections from each "X-weld" at a magnification of 30 diameters.

Example IX.—Effect of Manganese on Hot-Cracking of Iron-Diluted Nickel-Chromium Alloy Overlays Using the same series of electrodes as described in Example VIII and shown in Table IX, a series of single layer, multiple bead overlays on 3 inch by 6 inch by ⅜ inch thick mild steel plate was prepared. After welding, the surface of the overlays was ground smooth and polished with a rubber-bonded No. 100 grit abrasive wheel. The overlays were then given a longitudinal bend until cracks appeared in the overlay deposit. The elongation was measured between scribe marks spaced 1 inch apart, transversely across the center of the overlay deposit, before bending. The results of these bend tests are shown in Table XI.

TABLE XI

| Electrode No. | Manganese content of iron-diluted overlay, percent | Elongation to failure, percent |
|---|---|---|
| 1 | 1.66 | 20 |
| 2 | 2.01 | 18 |
| 3 | 2.10 | 27 |
| 4 | 2.75 | 40 |
| 5 | 3.70 | 42 |
| 6 | 4.94 | 48 |

Each of Tables X and XI demonstrate that the manganese content in the weld deposit and/or overlay has a very desirable and beneficial effect, even where the weld is iron-diluted. For example, referring to Table X, electrode 7, at about 7.5 to 8% manganese, no cracks were observed even when submitted to the very severe "X-weld" crack test.

The present invention is applicable to the welding and overlaying of nickel and iron alloys containing up to 100% nickel, up to 100% iron, up to 30% chromium, up to 30% copper, up to 0.25% carbon, and up to 40% cobalt. For example, the present invention is particularly suited to the welding of nickel-chromium alloys to themselves; for joining these alloys to steel and for overlaying such materials on steel; for welding the clad side of nickel-chromium alloy clad steels, and for joining nickel-chromium alloys, mild steel, AISI 200, 300, 400 and 500 steels to each other or to themselves in all positions with freedom from such detrimental characteristics, porosity and hot-cracking even when dilution of the weld with iron is encountered. The high level of weld quality made possible through the electrodes of this invention permits the use of arc-welding techniques in even the most critical applications, where assurance of top quality is of the utmost importance.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. An all-position welding electrode having a core wire containing, by weight, about 17% chromium, about 6.5% iron, about 3% titanium, about 2.3% manganese, with the balance being essentially nickel and a flux coating upon said core wire, said flux coating containing, in parts by weight, about 18 parts of calcium carbonate, about 18 parts of cryolite, about 18 parts of manganese carbonate, about 18 parts of titanium dioxide, about 15 parts of manganese powder, about 3 parts of bentonite, about 10 parts of columbium and a silicate type binder; said electrode being characterized in use by the formation of crack-free and porosity-free weld deposits.

2. An all-position welding electrode having a core wire containing, by weight, from about 15% to about 20% chromium, up to about 8% iron, from about 2% to about 3.5% titanium, from about 2% to about 4% manganese, and at least about 65% nickel and a flux coating upon said core wire, said flux coating containing, in parts by weight, from about 15 to about 25 parts of calcium carbonate, from about 10 to about 25 parts of cryolite, from about 10 to about 25 parts of manganese carbonate, from 10 to about 25 parts of titanium dioxide, from about 10 to about 20 parts of manganese powder, about 2 to about 5 parts of bentonite, from about 5 parts to about 15 parts of columbium and a silicate type binder; said electrode containing up to 4.5% columbium, by weight of the electrode, and from about 8% to about 15% manganese, by weight of the electrode and being characterized in use by the formation of crack-free and porosity-free weld deposits.

3. An all-position welding electrode having a core wire containing, by weight, from about 10% to about 30% chromium, up to about 8% iron, and from about 2% to about 3.5% titanium, up to about 7% manganese, with the balance being essentially nickel and a flux coating upon said core wire, said flux coating containing, in parts by weight, from about 15 to about 25 parts of calcium carbonate, from about 10 to about 25 parts of cryolite, from about 10 to about 25 parts of manganese carbonate, from 10 to about 25 parts of titanium dioxide, from about 10 to about 25 parts of manganese powder, about 2 to about 5 parts of bentonite, from about 5 parts to about 15 parts of columbium and a silicate type binder; said electrode containing up to 4.5% columbium, by weight of the electrode, and from about 8% to about 15% manganese, by weight of the electrode and being characterized in use by the formation of crack-free and porosity-free weld deposits.

4. An all-position welding electrode having a core wire containing, by weight, from about 15% to about 20% chromium, up to about 8% iron, from about 2% to about 3.5% titanium, from about 2% to about 4% manganese, and at least about 65% nickel and a flux coating upon said core wire, said flux coating containing, in parts by weight, from about 15 to about 40 parts of calcium carbonate, from about 10 to about 35 parts of cryolite, from about 5 to about 30 parts of manganese carbonate, from 10 to about 35 parts of titanium dioxide, from about 5 to about 35 parts of manganese powder, about 2 to about 5 parts of bentonite, up to about 20 parts of columbium and a silicate type binder; said electrode containing up to 4.5% columbium, by weight of the electrode, and from about 4% to about 15% manganese, by weight of the electrode and being characterized in use by the formation of crack-free and porosity-free weld deposits.

5. An all-position welding electrode having a core wire containing, by weight, from about 10% to about 30% chromium, up to about 8% iron, from about 2% to about 3.5% titanium, and up to about 7% manganese, with the balance being essentially nickel and a flux coating upon said core wire, said flux coating containing, in parts by weight, from about 15 to about 40 parts of an alkaline earth metal carbonate, selected from the group consisting of calcium carbonate, barium carbonate and strontium carbonate, from about 10 to about 35 parts of cryolite, from about 5 to about 30 parts of manganese carbonate, from 10 to about 35 parts of titanium dioxide, from about 5 to about 35 parts of manganese powder, about 2 to about 5 parts of bentonite, and a silicate type binder; said electrode containing up to 4.5% columbium, by weight of the electrode, and from about 4% to about 15% manganese, by weight of the electrode and being characterized in use by the formation of crack-free and porosity-free weld deposits.

6. An arc welding electrode consisting of a nickel-chromium alloy core containing, by weight, from about 10% to about 30% chromium, up to about 8% iron, from about 2% to about 3.5% titanium, and up to about 7% manganese, with the balance being essentially nickel, and a coating therearound, said coating comprising flux-forming substances including about 5 parts to about 30 parts of manganese carbonate by weight of the flux, metallic substances, and a binder, said electrode containing up to 4.5% columbium, by weight of the electrode, and from about 4% to about 15% manganese, by weight of the electrode, and being characterized in use by the formation of crack-free and porosity-free weld deposits.

References Cited in the file of this patent

UNITED STATES PATENTS

| | | |
|---|---|---|
| 1,679,002 | Pilling | July 31, 1928 |
| 1,978,318 | Miller | Oct. 23, 1934 |
| 2,156,298 | Leitner | May 2, 1939 |
| 2,156,306 | Rapatz | May 2, 1939 |
| 2,547,432 | Anderson | Apr. 3, 1951 |
| 2,745,771 | Place et al. | May 15, 1956 |